United States Patent
Oberheim

(10) Patent No.: US 11,135,664 B2
(45) Date of Patent: Oct. 5, 2021

(54) TABLE SAW WITH A BEVEL PIVOT AXIS ALIGNMENT ARRANGEMENT

(71) Applicant: Robert Bosch GmbH, Stuttgart (DE)

(72) Inventor: Stephen C. Oberheim, Des Plaines, IL (US)

(73) Assignees: Robert Bosch Power Tools GmbH, Leinfelden-Echterdingen (DE); Robert Bosch GmbH, Stuttgart (DE)

( * ) Notice: Subject to any disclaimer, the term of this patent is extended or adjusted under 35 U.S.C. 154(b) by 142 days.

(21) Appl. No.: 16/552,090

(22) Filed: Aug. 27, 2019

(65) Prior Publication Data
US 2021/0060671 A1 Mar. 4, 2021

(51) Int. Cl.
B23D 45/06 (2006.01)
B23D 47/02 (2006.01)

(52) U.S. Cl.
CPC ......... *B23D 45/062* (2013.01); *B23D 47/025* (2013.01)

(58) Field of Classification Search
CPC .... B23D 45/065; B23D 47/025; B23D 45/62; B23D 47/02; B23D 45/068; B23D 45/067; B27B 5/243; B27B 5/29; Y10T 83/9773; Y10T 83/7726; Y10T 83/7705; Y10T 83/773
USPC .... 83/477.2, 477.1, 473, 581, 508.2, 698.11, 83/491, 609
See application file for complete search history.

(56) References Cited

U.S. PATENT DOCUMENTS

| | | | | |
|---|---|---|---|---|
| 1,669,941 A | * | 5/1928 | Kennedy | B27B 5/265 83/473 |
| 2,704,560 A | * | 3/1955 | Woessner | B27B 5/243 83/473 |
| 5,735,054 A | * | 4/1998 | Cole | B23D 59/002 33/471 |
| 6,530,303 B1 | | 3/2003 | Parks et al. | |
| 8,122,807 B2 | | 2/2012 | Gass et al. | |
| 9,981,326 B2 | | 5/2018 | Gass et al. | |
| 2003/0000359 A1 | | 1/2003 | Eccardt et al. | |
| 2006/0219075 A1 | | 10/2006 | Liu et al. | |
| 2018/0339422 A1 | | 11/2018 | Fulmer et al. | |

OTHER PUBLICATIONS

International Search Report corresponding to International Patent Application No. PCT/EP2020/071956, dated Nov. 4, 2020 (5 pages).

* cited by examiner

*Primary Examiner* — Ghassem Alie
(74) *Attorney, Agent, or Firm* — Maginot, Moore & Beck LLP

(57) ABSTRACT

A table saw includes a table that defines a saw blade slot and a first trunnion member defining a first axis point of a bevel pivot axis, wherein the first trunnion member supports a saw carriage. The table saw further includes a first mounting arrangement configured to fix the first trunnion member to the table in an engaged state of the first mounting arrangement, and a horizontal axis alignment arrangement configured, in a disengaged state of the first mounting arrangement, to inhibit lateral movement of the first trunnion member and to allow vertical movement of the first trunnion member.

18 Claims, 11 Drawing Sheets

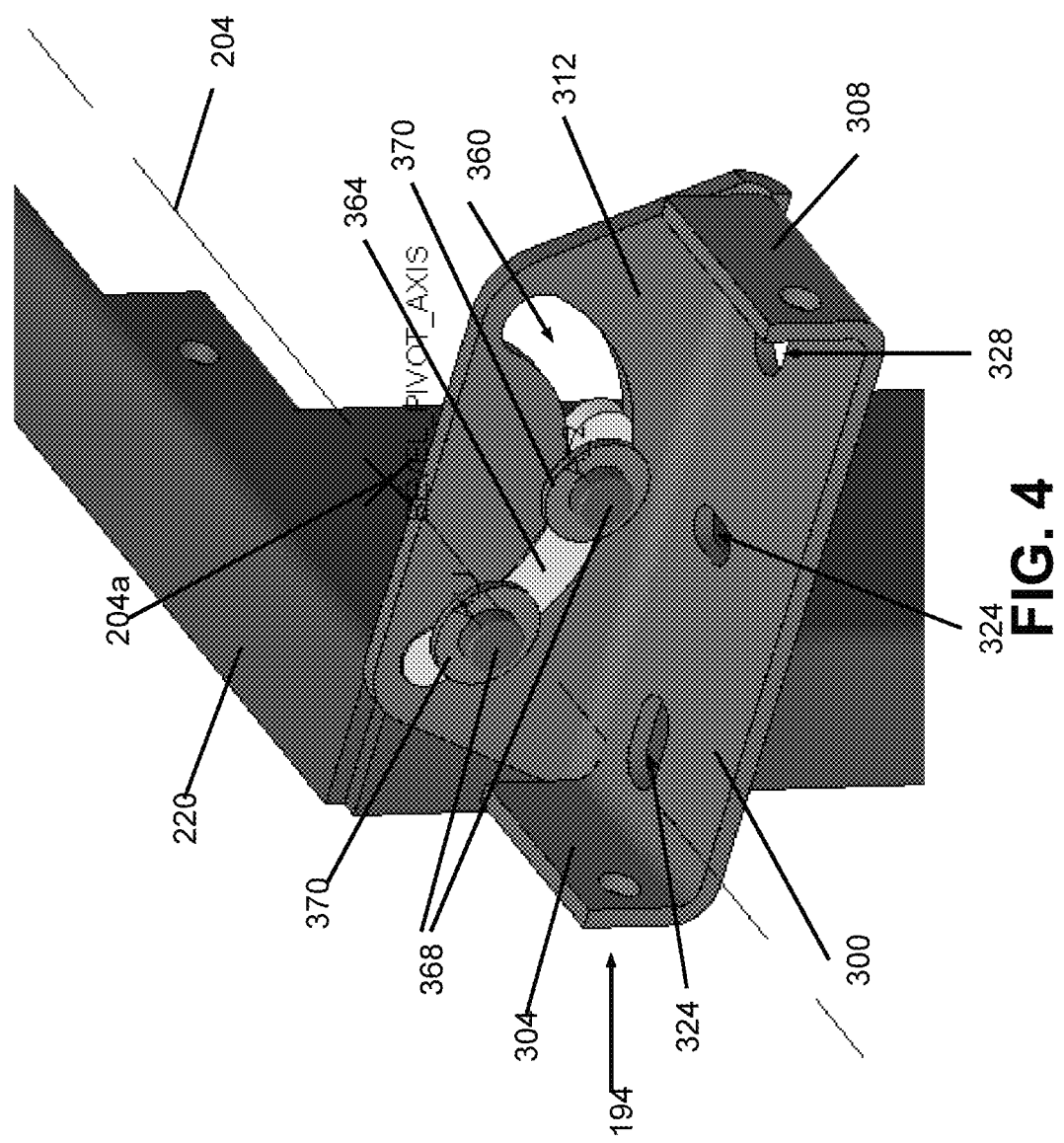

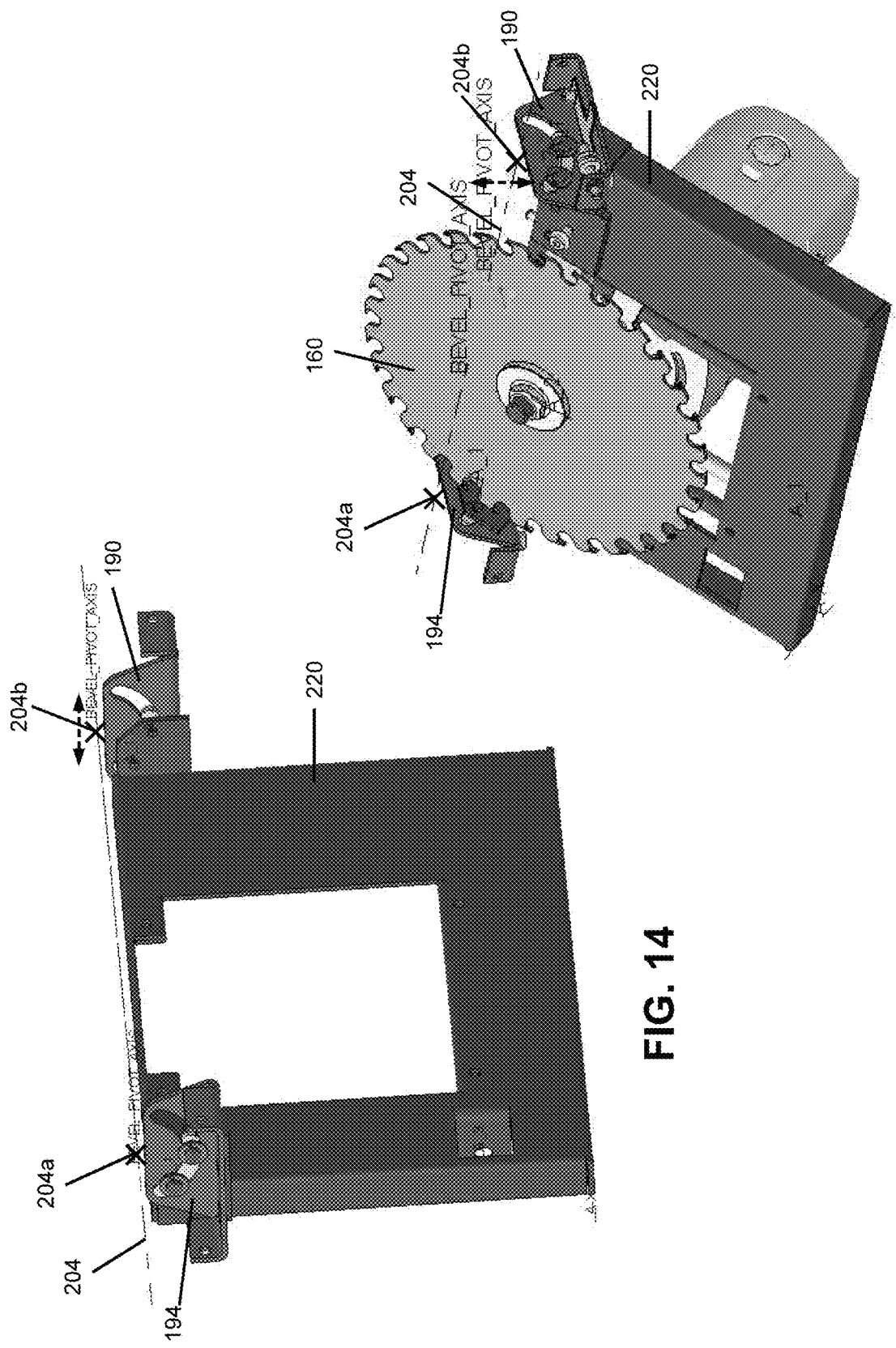

TABLE SAW WITH A BEVEL PIVOT AXIS ALIGNMENT ARRANGEMENT

TECHNICAL FIELD

This disclosure relates generally to table saws, and more particularly to bevel pivot axis alignment systems for table saws.

BACKGROUND

Table mounted cutting tools, such as table saws, are valuable tools used for a variety of tasks, such as crosscutting wood, and ripping large boards or panels into narrow strips. While there are a variety of table saw designs, most table saws include a base housing structure that supports a table top and a cutting assembly positioned below the table top. The table top has a substantially planar upper surface upon which workpieces may be supported.

The cutting assembly includes a circular saw blade that is mounted on an arbor with a portion of the blade extending upwardly through an opening defined in the table top. The cutting assembly also includes a motor with power train for rotating the arbor so that the cutting blade may be driven to perform cutting operations on workpieces supported on the table top. As the motor drives the cutting blade to rotate, a workpiece may be moved across the table top against the blade to allow the blade cut the workpiece.

Many table saws include a beveling feature that enables the user to rotate the blade relative to the plane of the table top to perform a bevel cut. The beveling feature is generally enabled by a bevel carriage, which supports the motor and blade. The bevel carriage can be rotated so as to pivot the blade and motor relative to the table top such that the portion of the blade extending through the table top opening is positioned at a bevel angle relative to the table top surface. As the bevel carriage pivots through different bevel angles, it can be thought of as pivoting about a bevel axis.

The bevel axis is what ultimately controls the parallelism alignment of the sawblade with respect to the miter slot. When the bevel axis is in perfect alignment, it fulfills two conditions. The first condition is that the bevel axis is parallel to the miter slot in the 0 degree bevel position (i.e. when the saw blade is vertical). In other words, from a top view of the table top, i.e. in a horizontal plane parallel to or coincident with the table top, the bevel axis is parallel to the miter slot. The bevel axis alignment in the horizontal plane is also referred to herein as the horizontal plane axis alignment. If the horizontal plane axis alignment is accurate, the saw blade is parallel to the miter slot when the bevel carriage is in the zero degree bevel position (i.e. the blade is oriented straight up).

The second condition for perfect bevel axis alignment is to have the bevel axis also be parallel to the plane of the table top. When viewing the bevel axis against a vertical plane that is perpendicular to the saw blade in the zero degree bevel position, the bevel axis should be parallel to the table top. The alignment of the bevel axis in the vertical plane is also referred to herein as the vertical plane axis alignment. When the vertical plane axis alignment is good, the saw blade can be beveled at various angles and still be parallel to the table (and the miter slot).

Poor horizontal plane axis alignment can cause cutting defects. For example, misalignment of the horizontal axis can cause burnt cut edges, drifting of the workpiece edge from the saw fence, and cuts that are out of square. In addition, it is possible for the bevel axis to have good horizontal plane alignment, but poor vertical plane alignment. When this occurs, the sawblade will be parallel to the miter slot in the 0 degree bevel position (blade vertical), but at higher bevel angles, alignment with the miter slot will become poorer, causing burnt edges or uneven cuts. To avoid these issues, the bevel axis should be accurately aligned in both the vertical plane and the horizontal plane.

Conventional table saws are configured such that horizontal alignment requires first loosening the mounting bolts retaining the front and rear trunnion brackets, which support the saw assembly and define the virtual axis about which the saw blade bevels. The bevel carriage is then moved until there is a "trial" alignment with the miter saw slot, at which point the mounting bolts are tightened. The user then moves a dial indicator across the saw blade to determine whether the saw blade is in fact aligned with the slot. If the saw blade is properly aligned with the slot, then the process is finished. More often than not, however, the saw blade is not aligned accurately at the first attempt since the adjustment is merely done by the touch or guess by the user. Typically, the horizontal alignment must be repeated several times until the desired accuracy is achieved.

To provide vertical plane axis alignment, two additional steps are required. First the saw blade is beveled to the 45 degree position. Then, the trunnion brackets are shimmed up or down with respect to the table until the sawblade is parallel to the miter slot (or table). In order to shim the trunnions, however, the mounting bolts that set the horizontal alignment must be loosened, which can cause the horizontal plane alignment to be lost. As a result, the vertical and horizontal plane bevel axis alignment cannot be adjusted independently of one another with conventional saws.

What is needed therefore is a system for aligning the saw blade bevel pivot axis in an accurate and efficient manner.

SUMMARY

In one embodiment, a table saw comprises a table that defines a saw blade slot and a first trunnion member defining a first axis point of a bevel pivot axis, wherein the first trunnion member supports a saw carriage. The table saw further includes a first mounting arrangement configured to fix the first trunnion member to the table in an engaged state of the first mounting arrangement, and a horizontal axis alignment arrangement configured, in a disengaged state of the first mounting arrangement, to inhibit lateral movement of the first trunnion member and to allow vertical movement of the first trunnion member.

In another embodiment, the horizontal axis alignment arrangement comprises an elongated member having a threaded region. The first trunnion member defines a threaded opening, and the threaded region engages the threaded opening.

In a further embodiment, the elongated member includes a radially enlarged portion, and the horizontal axis arrangement further comprises a projection extending from an underside of the table. The projection defines a central recess in which the radially enlarged portion is positioned, and the radially enlarged portion interacts with the projection so as to inhibit lateral movement of the first trunnion member.

In yet another embodiment of the table saw, the elongated member is configured such that rotational movement of the elongated member about an axis of the elongated member causes a controlled lateral movement of the first trunnion member relative to the table.

In one embodiment, the projection defines two vertical slots in which the elongated member is positioned. The elongated member is vertically movable in the two vertical slots so as to enable vertical movement of the first trunnion member in the disengaged state of the first mounting arrangement.

In a further embodiment, the horizontal axis alignment arrangement further comprises a first washer and a second washer arranged in the central recess. The first washer has a first conical or spherical surface that engages a corresponding first conical or spherical surface of a first side of the radially enlarged portion, and the second washer has a second conical or spherical surface that engages a corresponding second conical or spherical surface of a second side of the radially enlarged portion.

In yet another embodiment, of the table saw, the horizontal axis alignment arrangement further comprises a jam nut removably arranged on the threaded member and configured to engage the first trunnion member so as to disable lateral movement of the first trunnion member.

In some embodiments, the table comprises a first undercarriage mounting member, and the first mounting arrangement comprises at least two mounting fasteners configured in the engaged state to clamp the first trunnion member to the first undercarriage mounting member.

The table saw may, in another embodiment, further comprise at least one shim member clamped between the first trunnion member and the table and configured to space the first trunnion member apart from the table so as to adjust a vertical position of the first axis point relative to the table.

In another embodiment, the horizontal axis alignment arrangement is configured such that, in the disengaged state of the first mounting arrangement, lateral movement of the first trunnion member enabled only by actuation of the horizontal axis alignment arrangement.

Some embodiments of the table saw further comprise a second trunnion member defining a second axis point of the bevel pivot axis and a second mounting arrangement having an engaged state of the second mounting arrangement in which the second mounting arrangement fixes the second trunnion member to the table. In a disengaged state of the second mounting arrangement, the lateral movement of the first trunnion by the actuation of the horizontal axis alignment arrangement causes the second trunnion member to pivot about a pivot axis that is substantially perpendicular to the bevel pivot axis.

A method according to the disclosure of adjusting a bevel pivot axis of a table saw includes disengaging a first mounting arrangement to unclamp a first trunnion member from a table that defines a saw blade slot with a longitudinal axis, wherein the first trunnion member defines a first axis point of a bevel pivot axis and supports a saw carriage. The method further includes inhibiting lateral movement and enabling vertical movement of the first trunnion member with a horizontal axis adjustment arrangement when the first mounting arrangement is disengaged.

In one embodiment of the method, the horizontal axis alignment arrangement comprises an elongated member having a threaded region and the first trunnion member defines a threaded opening, and the inhibiting of the lateral movement includes inhibiting the lateral movement by threaded engagement of the threaded region and the threaded opening.

In a further embodiment of the method, the inhibiting of the lateral movement includes inhibiting the lateral movement with a projection extending from an underside of the table that interacts with a radially enlarged portion of the elongated member, the radially enlarged portion positioned in a central recess of the projection.

In some embodiments, the method further comprises rotating the elongated member about an axis of the elongated member to cause a controlled lateral movement of the first trunnion member relative to the table.

In another embodiment, the method includes enabling vertical movement of the first trunnion member when the first mounting arrangement is disengaged via vertical movement of the elongated member within two slots defined in the projection.

In yet another embodiment, the disengaging of the first mounting arrangement includes disengaging at least two mounting fasteners so as to unclamp the first trunnion member from a first undercarriage mounting member of the table.

The method may, in some embodiments, further comprise inserting or removing at least one shim member between the first trunnion member and the table so as to adjust a spacing between the first trunnion member and the table to adjust a vertical position of the first axis point relative to the table.

In some embodiments, the horizontal axis alignment arrangement is actuated when the first mounting arrangement is disengaged to laterally move the first trunnion member, wherein lateral movement of the first trunnion member is enabled only by actuation of the horizontal axis alignment arrangement.

In one embodiment, the method further comprises disengaging a second mounting arrangement such that a second mounting arrangement allows movement of a second trunnion member relative to the table, the second trunnion member defining a second axis point of the bevel pivot axis and supporting the saw carriage, and pivoting the second trunnion member about a pivot axis that is substantially perpendicular to the bevel pivot axis when the horizontal axis alignment arrangement is actuated to laterally move the first trunnion member.

BRIEF DESCRIPTION OF THE DRAWINGS

FIG. 4 is a front perspective view of a second trunnion member of the bevel pivot axis arrangement connected to a saw carriage in the undercarriage assembly of FIG. 2.

FIG. 14 is a side perspective view of the bevel pivot axis adjustment arrangement of FIG. 2 in the zero degree bevel position.

FIG. 15 is a side perspective view of the undercarriage assembly of FIG. 2 in the 45 degree bevel position.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" refers to values that are within ±10% of the reference value.

Figure 1:
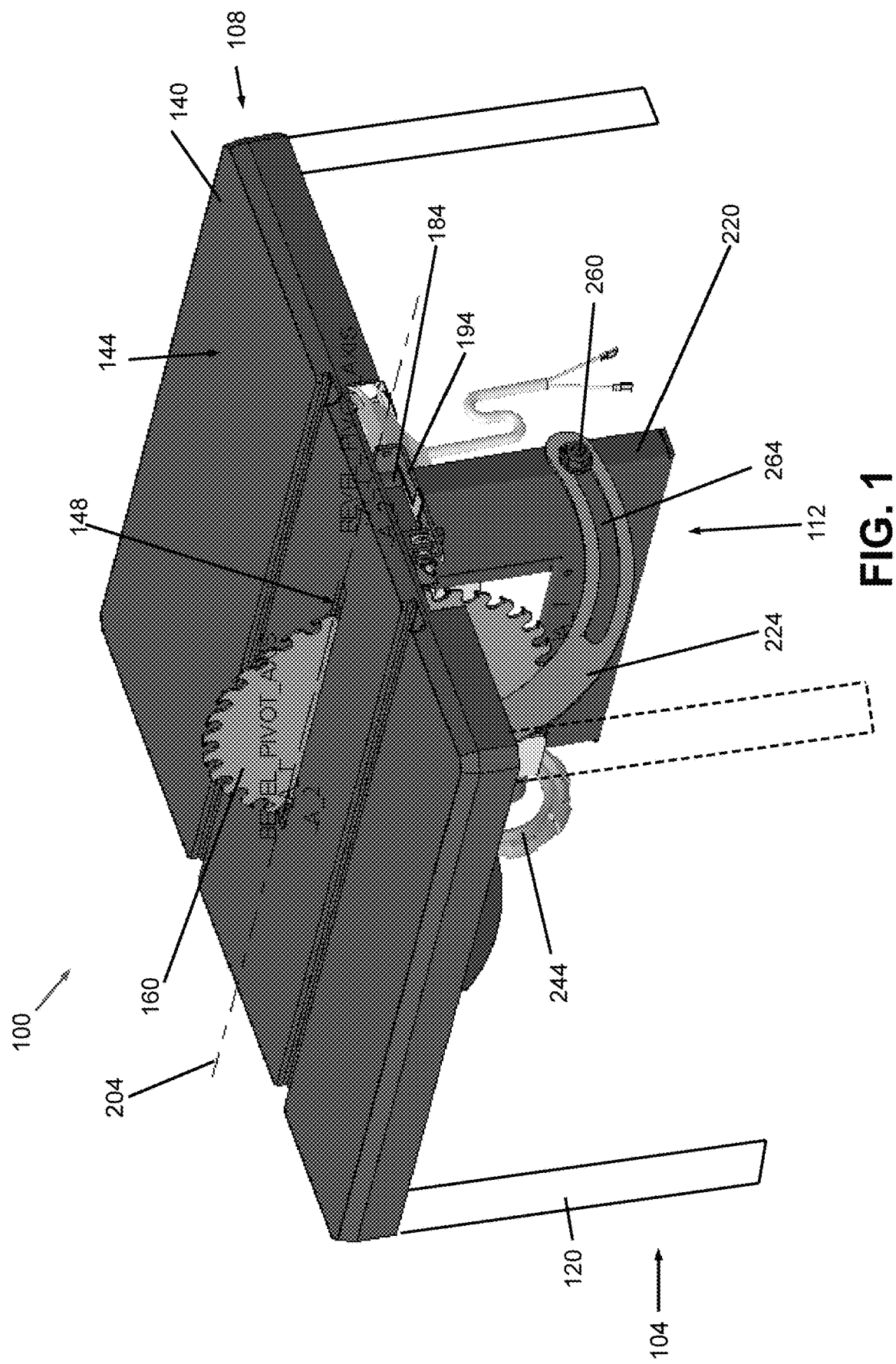
FIG. 1 is a rear perspective view of a table saw having a bevel pivot axis adjustment arrangement.

FIG. 1 illustrates a table saw 100 having a bevel axis alignment system that enables quick and accurate alignment of the bevel axis in both the vertical and horizontal planes. The table saw 100 includes a base assembly 104, a table assembly 108, and an undercarriage assembly 112. The base assembly 104 is configured to support the table assembly 108. In the view of FIG. 1, the base assembly 104 is depicted as a plurality of support legs 120, though the reader should appreciate that the base assembly 104 may, in other embodiments, include a frame structure and/or a housing enclosing the undercarriage assembly 112.

The table assembly 108 includes a table 140 with a substantially planar table top surface 144 configured to support a workpiece during cutting. The table 140 defines a saw blade slot 148, through which a saw blade 160 extends when the table saw 100 is in use. In addition, the table 140 includes a first undercarriage mounting member 180 and a second undercarriage mounting member 184, which, as discussed in detail below, support the undercarriage assembly 112 on the underside of the table 140.

Figure 3:
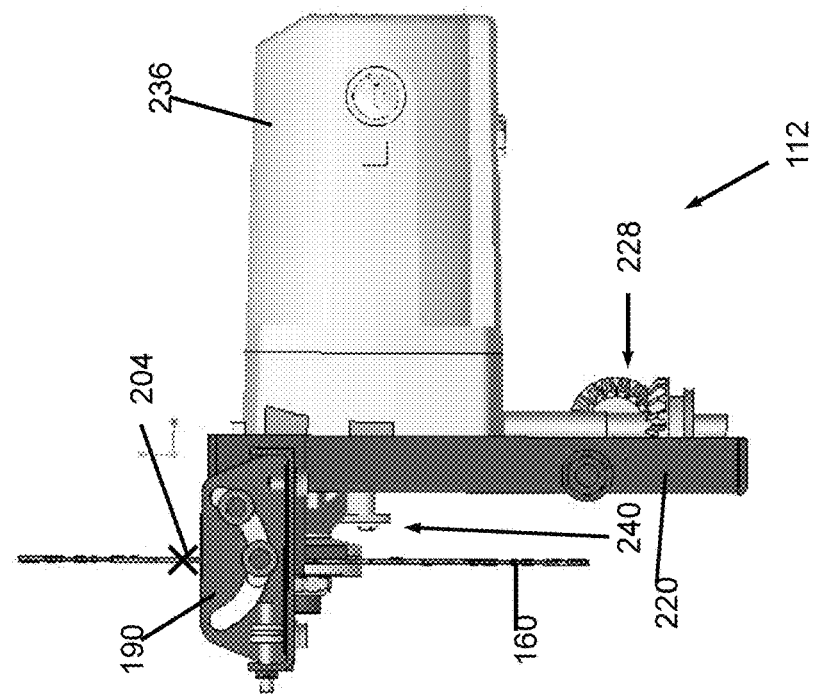
FIG. 3 is a rear plan view of the undercarriage assembly of FIG. 2.
Figure 2:
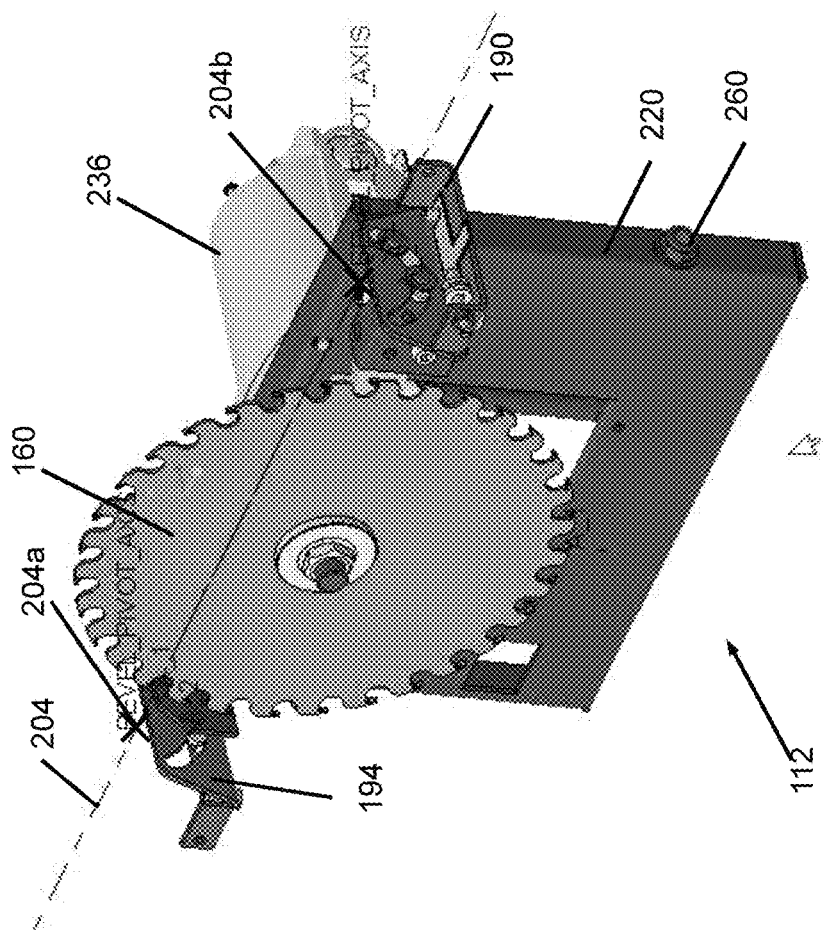
FIG. 2 is a side view of the undercarriage assembly of the table saw of FIG. 1 depicting the bevel pivot axis adjustment arrangement.

As best seen in FIGS. 2 and 3, the undercarriage assembly 112 includes a first trunnion member 190 and a second trunnion member 194, which are attached to the first and second undercarriage mounting members 180, 184, respectively, so as to mount the undercarriage assembly 112 to the underside of the table 140. In addition, as described in detail below, the first and second trunnion members 190, 194 form part of a bevel axis alignment system, which enables both horizontal axis alignment and vertical axis alignment of the bevel pivot axis 204 of the saw blade 160.

The undercarriage assembly 112 further includes a saw carriage 220 that is supported by the first and second trunnion members 190, 194 and by a bevel guide 224. The saw carriage 220 is operably connected to a height adjustment assembly 228, which supports a motor 236 and power train 240 in such a way that the motor 236 and power train 240 can be raised and lowered relative to table 140 by rotation of the height adjustment wheel 244. The saw blade 160 is attached to an arbor shaft (not shown) of the power train 228 in such a way that, when activated, the motor 236 spins the saw blade 160 via the power train 240 so as to enable the saw blade 160 to cut a workpiece.

In addition, referring back to FIG. 1, the saw carriage 220 includes a follower 260, which moves within an arcuate slot 264 of the bevel guide 224. The follower 260 locks the lower portion of the saw carriage 220 when the bevel system is locked.

FIG. 4 illustrates a perspective view of the second trunnion member 194 and the saw carriage 220. The second trunnion member 194 includes a bottom portion 300, two side flanges 304, 308, and a rear flange 312. As illustrated, the second trunnion member 194 is formed of a single piece of material, for example sheet metal, that is bent to shape illustrated in FIG. 4 so as to form a trunnion bracket. In other embodiments, however, the second trunnion member 194 may be formed of a plurality of pieces of material welded, fastened, or otherwise connected together. In some embodiments, the second trunnion member 194 may be formed of, for example, steel, aluminum, plastic, reinforced composites, or another suitable material.

The bottom portion 300 of the second trunnion member 194 defines a longitudinal slot 320 that is centered laterally on the second trunnion member 194 and has a greater length in the longitudinal direction (i.e. front to back when the second trunnion member 194 is viewed from the front) than in the lateral direction (i.e. left to right when viewed from the front). The bottom portion 300 also defines two lateral slots 324, 328, which are arranged symmetrically on opposite sides relative to the longitudinal axis and have a greater width in the lateral direction than in the longitudinal direction.

Figure 5:
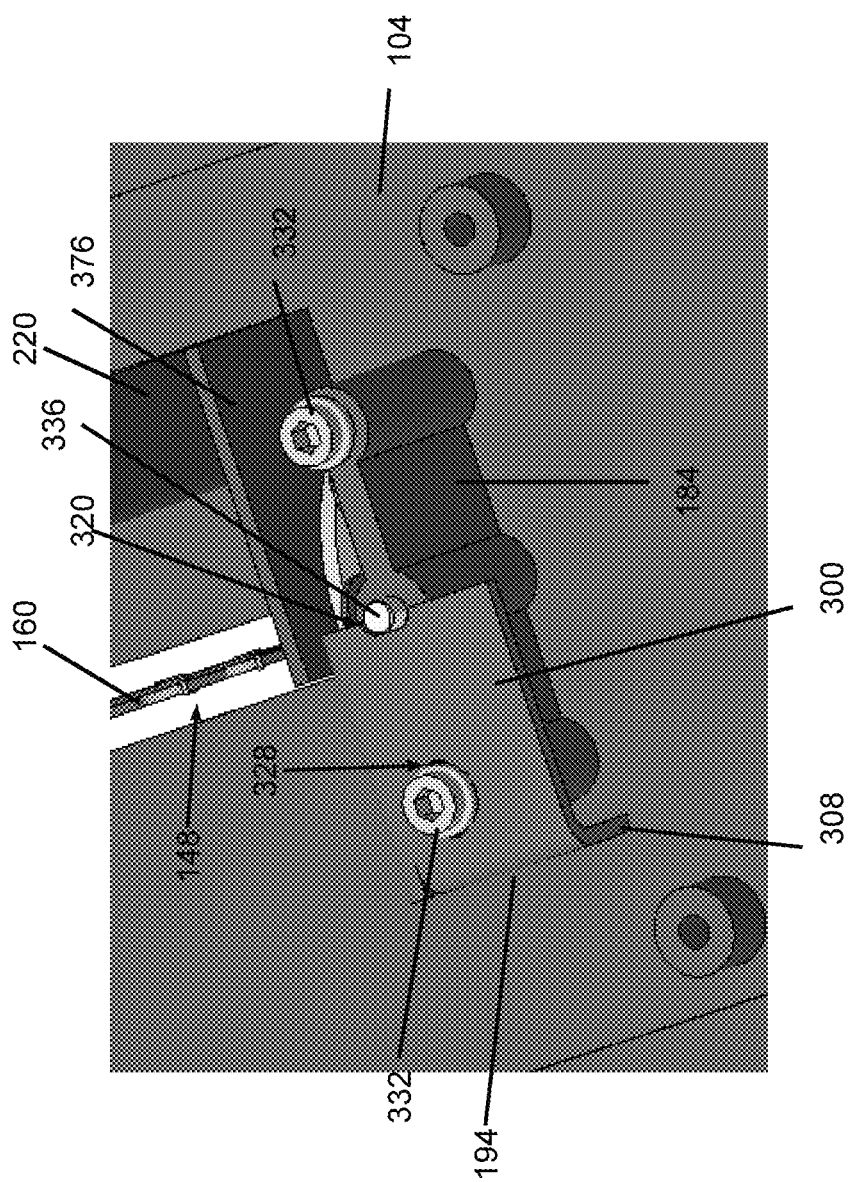
FIG. 5 is a bottom partial cutaway perspective view of the second trunnion member of the undercarriage assembly of FIG. 2 in which only one half of the second trunnion member is depicted and in which the second trunnion member is shown connected to a second undercarriage mounting member of the table.

As illustrated in FIG. 5, which is a partial cutaway view of the second trunnion member 194 and the underside of the table 104, a front mounting arrangement includes two front mounting fasteners 332, each of which extends through one of the lateral slots 324, 328 into a threaded hole (not shown) in the second undercarriage mounting member 184 of the table 140 to clamp the second trunnion member 194 to the table 140. When the front mounting fasteners 332 are not clamped, however, the second trunnion member 194 can move laterally relative to the table 140 as the lateral slots 324, 328 move laterally around to the front mounting fasteners 332. A pivot pin 336 projects downwardly from the second undercarriage mounting member 184 into the longitudinal slot 320 of the second trunnion member 194. The pivot pin 336 establishes a pivot axis around which the second trunnion member 194 can pivot when the front mounting fasteners 332 are disengaged or not clamped. Additionally, the longitudinal slot 320 allows slight longitudinal movement of the second trunnion member 194 when the front mounting fasteners 332 are disengaged or not clamped.

Figure 6:
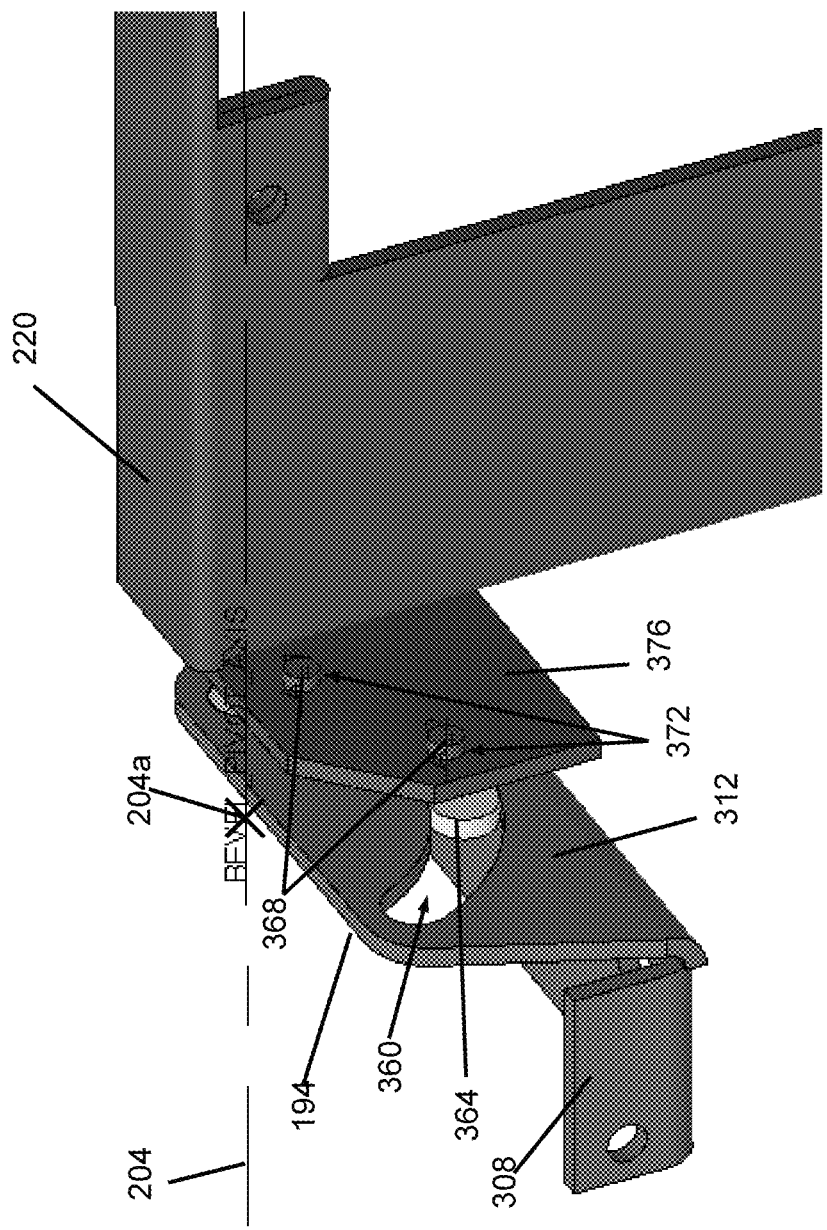
FIG. 6 is rear perspective view of the second trunnion member of the bevel pivot axis adjustment arrangement of FIG. 2 connected to the saw carriage.

Referring now to FIGS. 4 and 6, the rear flange 312 of the second trunnion member 194 defines an arcuate slot 360, in which an arcuate follower 364 is arranged. The arcuate follower 364 defines two holes (not shown), and two fasteners 368 extend through respective thrust washers 370, through the holes in the arcuate follower 364, and into threaded holes 372 in a front mounting flange 376 of the saw carriage 220. The fasteners 368 connect the second trunnion member 194 to the front mounting flange 376 in such a way that the follower 364 can move within the arcuate slot 360, thereby pivoting the front end of the saw carriage 220 relative to the second trunnion member 194 and the table 140 about a virtual axis 204a that defines the front end of the bevel pivot axis 204.

Figure 7:
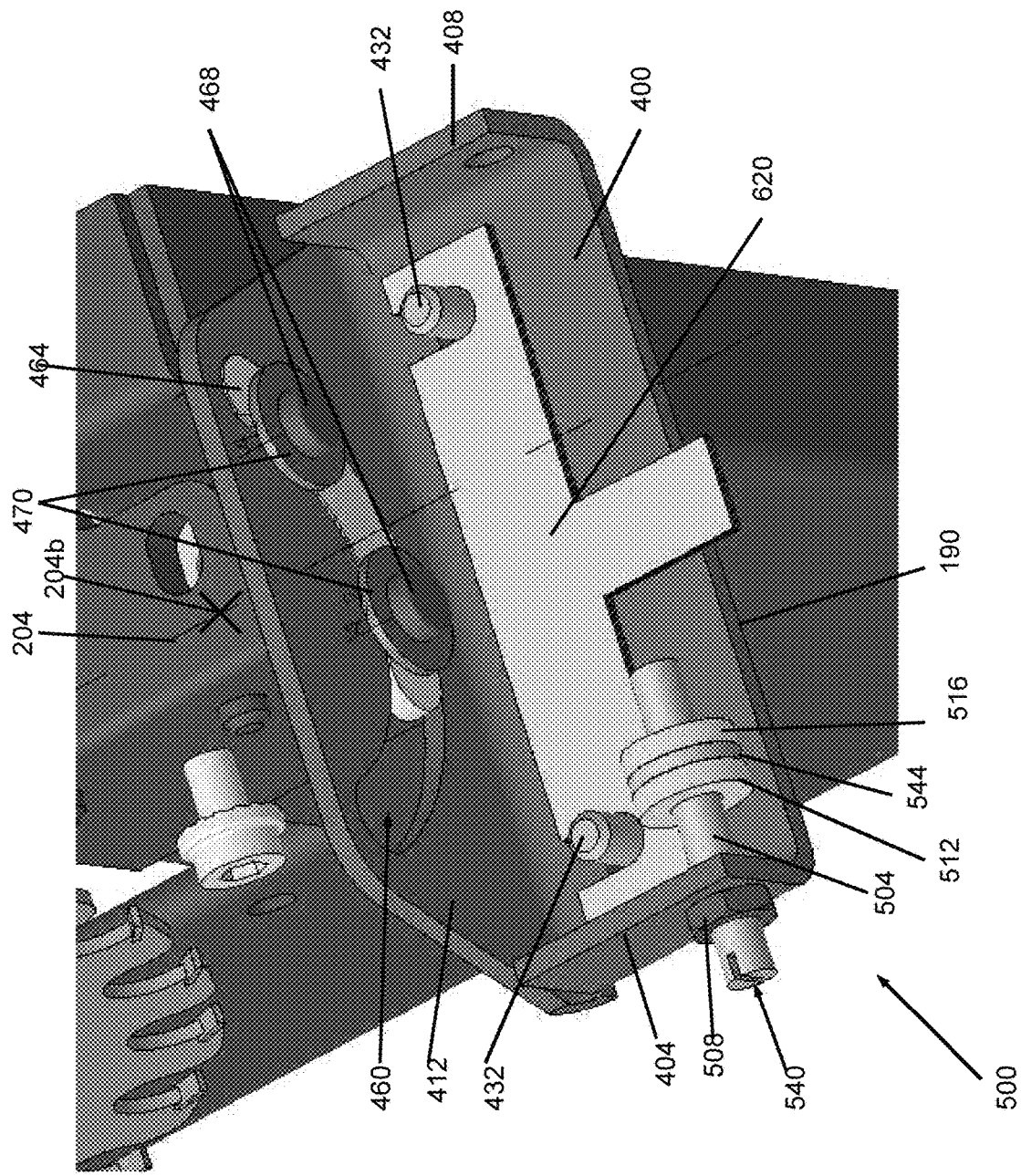
FIG. 7 is a top perspective view of a first trunnion member of the bevel pivot axis connected to the saw carriage in the undercarriage assembly of FIG. 2.
Figure 8:
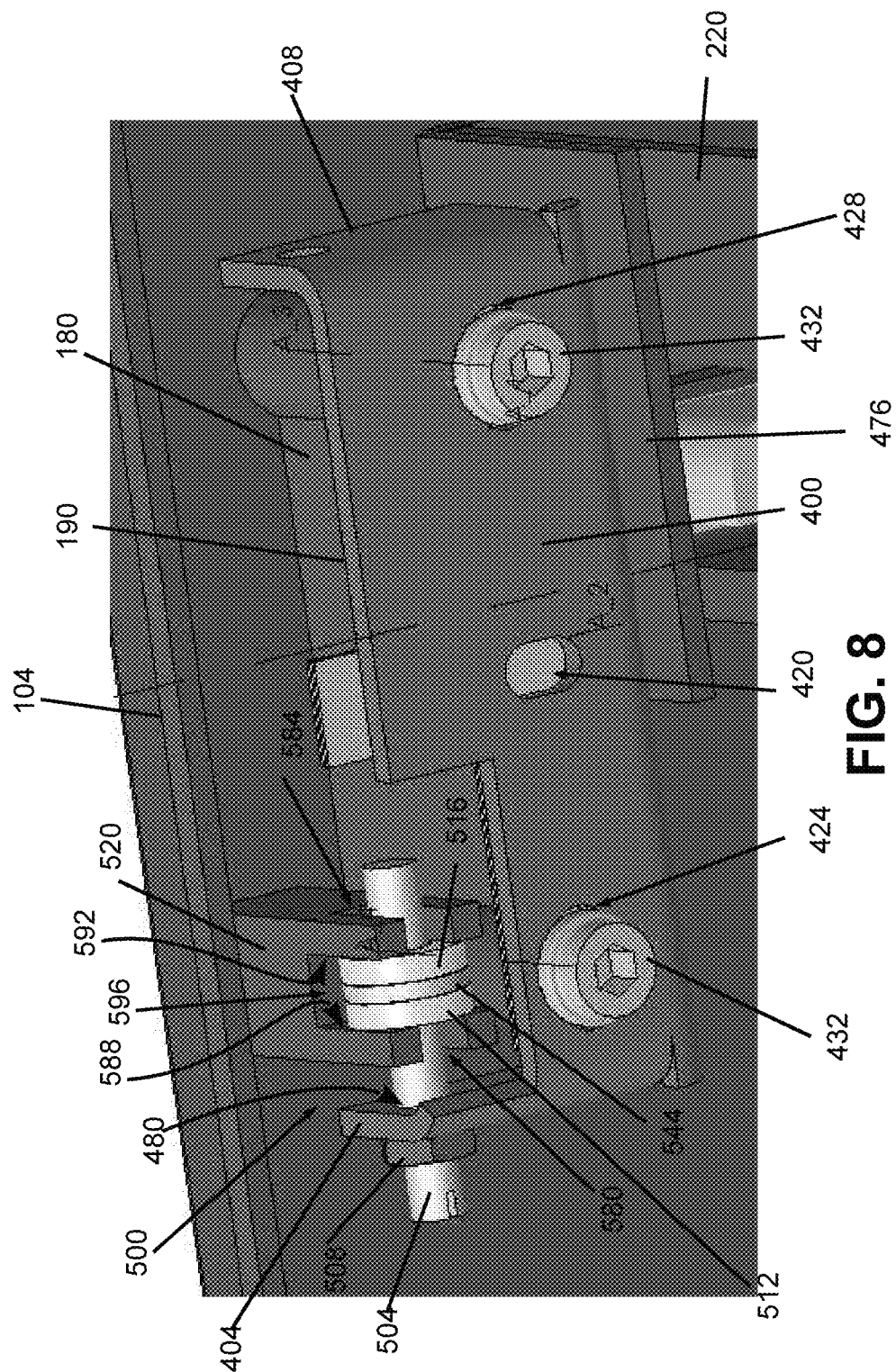
FIG. 8 is a partial cutaway bottom perspective view of the second trunnion member of FIG. 7 in which a portion of the second trunnion member is not shown to more clearly illustrate an alignment projection of the table.

As shown in FIGS. 7 and 8, in the illustrated embodiment, the first trunnion member 190 is identical to the second trunnion member 194. The first trunnion member 190 therefore includes a bottom portion 400, which defines a longitudinal slot 420 and two lateral slots 424, 428, two side flanges 404, 408, and a rear flange 412 with an arcuate slot 460. The side flange 404 of the first trunnion member 190 defines a threaded opening 480, which, as discussed below, facilitates the horizontal bevel axis adjustment.

The first trunnion member 190 is mounted to the first undercarriage mounting member 180 by a rear mounting arrangement in a similar manner as the second trunnion member 194 is mounted to the second undercarriage mounting member 184. In particular, as best seen in FIG. 8, the rear mounting arrangement includes two rear mounting fasteners 432, one of which extends through each of the lateral slots 424, 428 into a threaded hole (not shown) in the first undercarriage mounting member 180 of the table 140 to clamp the first trunnion member 190 to the table 140. When the rear mounting fasteners 432 are not clamped, however, the first trunnion member 190 can move laterally relative to the table 140 as the lateral slots 424, 428 move laterally relative to the rear mounting fasteners 432.

Referring back to FIG. 7 and with continuing reference to FIG. 8, the first trunnion member 190 supports a rear mounting flange 476 of the saw carriage 220 in a manner similar to the support of the front mounting flange 376 by the second trunnion member 194. In particular, an arcuate follower 464 is arranged in the arcuate slot 460 so as to be movable within the arcuate slot 460. Two fasteners 468 extend through respective thrust washers 470 and through holes (not shown) in the arcuate follower 464 into threaded holes (not shown) in the rear mounting flange 476. The fasteners 468 clamp the follower 464 to the rear mounting flange 476 in such a way that the follower 464 can move within the arcuate slot 460, thereby pivoting the rear end of the saw carriage 220 about a virtual axis point 220b that defines the rear end of the bevel pivot axis 204.

In embodiments in which the first and second trunnion members 190, 194 are identical, the first and second trunnion members 190, 194 can be used interchangeably, thereby simplifying manufacturing and maintenance of the table saw 100. The reader should appreciate, however, that in some embodiments, the first and second trunnion members 190, 194 may not be identical, and may omit certain holes or slots that are not used for the particular trunnion member.

Figure 9:
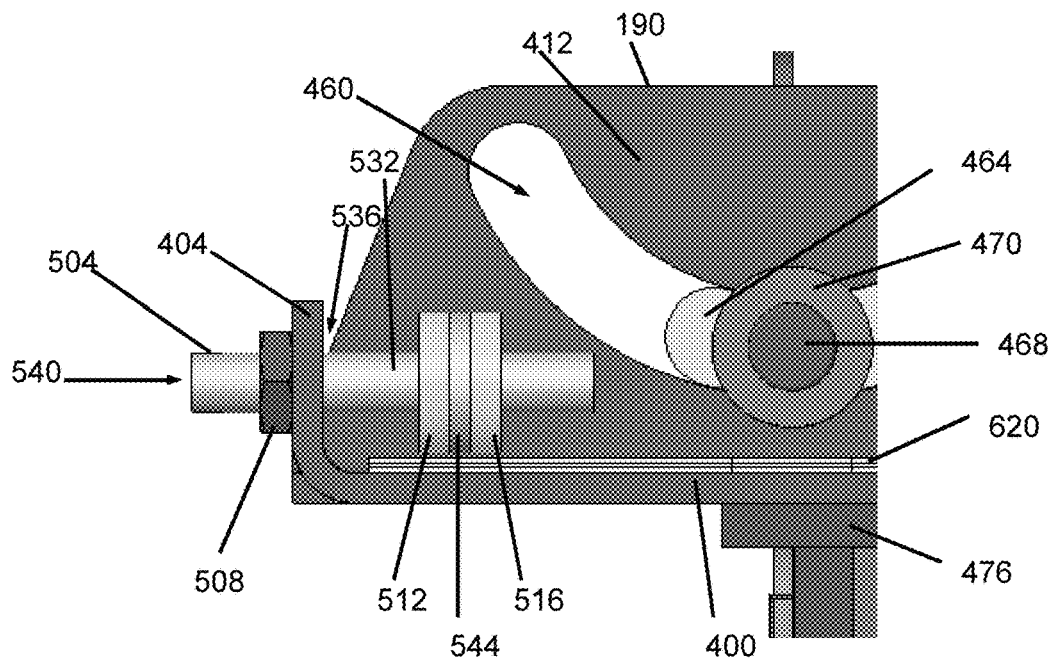
FIG. 9 is a detail front plan view of a horizontal axis alignment arrangement of the bevel pivot axis alignment arrangement and of the second trunnion member of FIG. 7.

As illustrated in FIGS. 7-9, the table saw 100 further includes a horizontal bevel axis adjustment arrangement 500 that cooperates with the first trunnion member 190 and the table 104 to adjust the horizontal alignment of the bevel axis 204 relative to the table 104 and saw blade slot 148 in a controlled manner even when the fasteners 468 of the rear mounting arrangement are loosened. The horizontal bevel axis adjustment arrangement 500 includes an elongated member 504, a jam nut 508, two washers 512, 516, and an aligning projection 520 that extends from the underside of the table 104.

Figure 10:
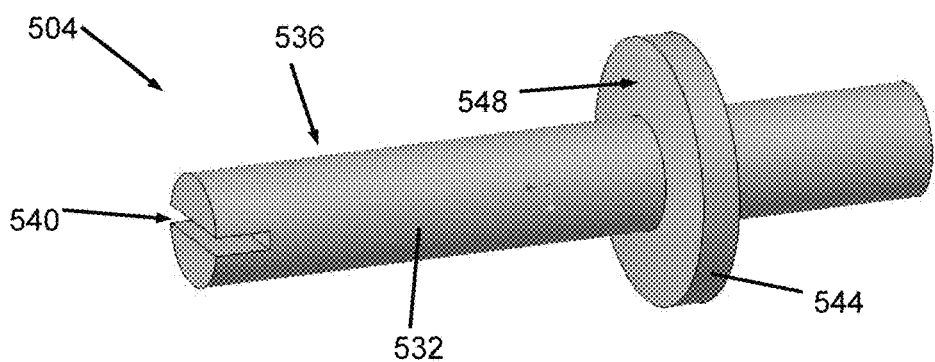
FIG. 10 is a side perspective view of an elongated member of the horizontal axis alignment arrangement of FIG. 9.
Figure 11:
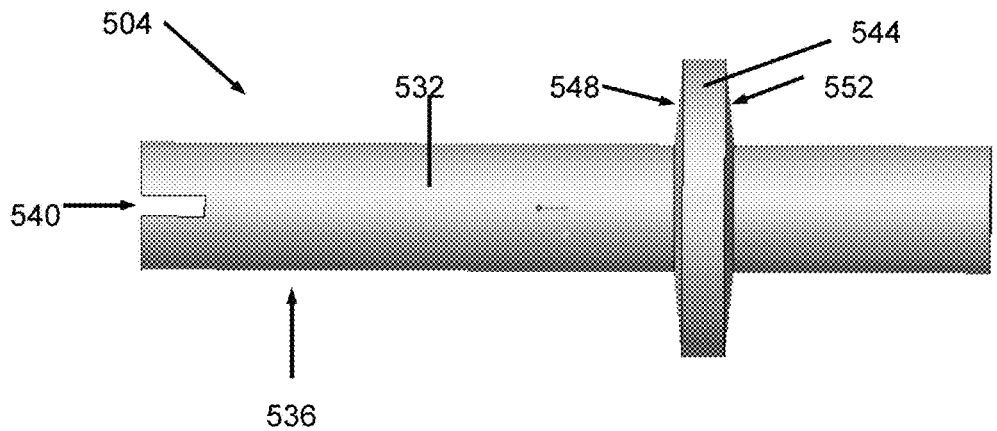
FIG. 11 is a side elevational view of the elongated member of FIG. 10.
Figure 13:
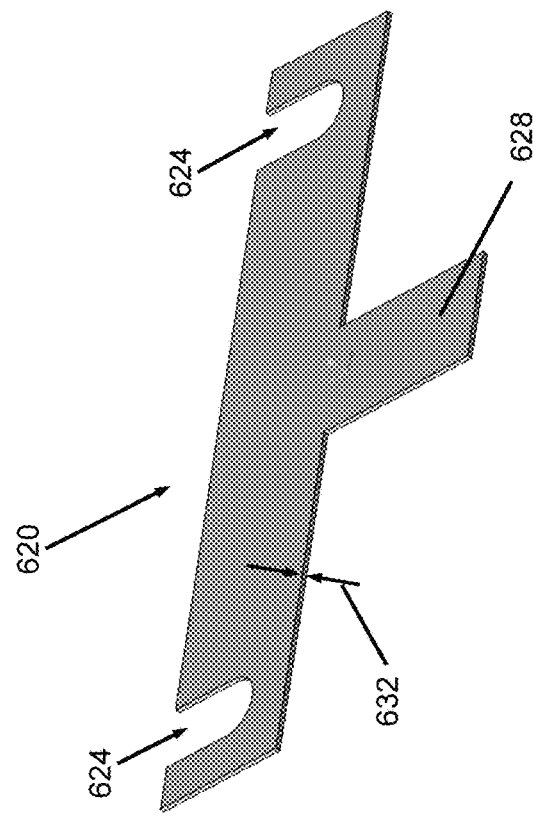
FIG. 13 is a top perspective view of a shim of the bevel pivot axis adjustment arrangement of FIG. 2.

The elongated member 504, depicted in detail in FIGS. 10 and 11, includes a rod portion 532 that is threaded at least in the region 536 of the jam nut 508 and threaded opening 480. The threaded region 536 is therefore threaded into the threaded opening 480 and the jam nut 508 is threaded onto the threaded region 536. At one end, the elongated member 504 defines an engagement region 540 configured to enable engagement of the elongated member 504 so that a user can actuate the elongated member 504 by rotating the elongated member 504. In the illustrated embodiment, the engagement region 540 is defined as a slot configured to receive a flat head screwdriver, though the reader should appreciate that other engagement regions are used in other embodiments, for example a recess configured to receive a Phillips head screwdriver, a hexagonal recess configured to receive a hex wrench, a hexagonal exterior feature configured to cooperate with a wrench, a thumb screw, or another desired engagement feature.

The elongated member 504 further includes a radially enlarged portion 544 that is fixedly connected to or integrally and monolithically formed with the rod portion 532 and which has an outer diameter that is greater than the diameter of the rod portion 532. Each axial end 548, 552 of the radially enlarged portion 544 has a conical or spherically-shaped surface.

Figure 12:
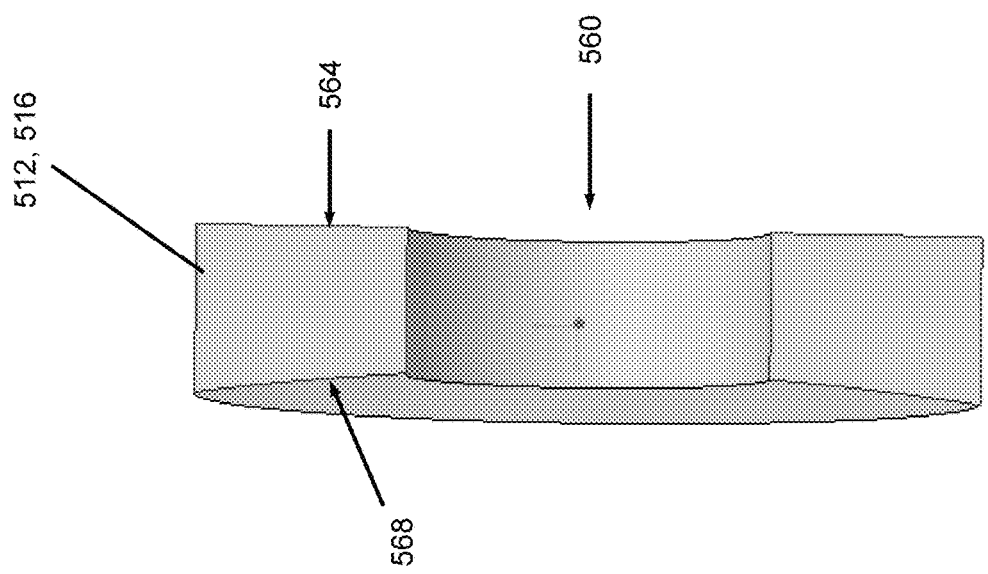
FIG. 12 is a cross-sectional view of a washer of the horizontal axis alignment arrangement of FIG. 9.

As illustrated in FIG. 12, each washer 512, 516 defines a central opening 560 that has a diameter slightly larger than the diameter of the rod portion 532 to enable slight radial play between the threaded washers 512, 516 and the rod portion 532 of the elongated member 504. For example, in one embodiment, the central opening 560 may have a diameter that is approximately 1 mm larger than the outer diameter of the rod portion 532. Additionally, each washer 512, 516 includes a flat surface 564 on one side and a conical or spherically-shaped surface 568 on the other side. The conical or spherically-shaped surface 568 is complementary to the respective axial end surface 548, 552 of the elongated member 504 so that the conical or spherically-shaped surfaces 568 engage the axial end surfaces 548, 552.

Referring back to FIG. 8, the aligning projection 520 extends downwardly from the underside of the table 104. The aligning projection 520 is fixedly attached to the table 104 or, in some embodiments, integrally and monolithically formed with the table 104. The aligning projection 520 defines two elongated slots 580, 584, each of which receives a part of the rod portion 532 of the elongated member 504 on an opposite side of the radially enlarged portion 544. The slots 580, 584 are substantially the same width as the diameter of the rod portion 532, and are elongated in the vertical direction so that the rod portion 532 has vertical play relative to the slots 580, 584.

The aligning projection 520 further includes two flat surfaces 588, 592, that define a central recess 596, in which the radially enlarged portion 544 of the elongated member 504 and the two washers 512, 516 are received in such a way that the flat surface 564 of each washer 512, 516 abuts the flat surface 588, 592 of the corresponding side of the recess 596.

The table saw 100 may further include one or more shims 620 positioned between the upper surface of the bottom portion 400 of the first trunnion member 190 and the first undercarriage mounting member 180. Each shim has two slots 624 that are configured and arranged so as to allow the slots 624 to receive the rear mounting fasteners 432 when positioned between the bottom portion 400 of the first trunnion member 190 and the first undercarriage mounting member 180. The shims 620 also have a handle portion 628 that extends beyond the end of the first trunnion member 190 opposite the rear flange 412 so as to enable a user to grasp the shim 620.

Each shim 620 has a thickness 632 in the vertical direction, which, as discussed in detail below, facilitates adjustment of the bevel axis vertical alignment. In one embodiment, the thickness 632 is approximately 0.5 mm thick, though in other embodiments, the shims 620 may have a different thickness. In addition, the reader should appreciate that the table saw 100 may multiple shims 620 with different thicknesses.

The bevel pivot axis 204 is arranged at the top of the table 104 at the saw blade 160 so that, when the sawblade is beveled to different angle, the distance from the saw blade 160 to the guide fence does not change and therefore the width of a cut in wood is the same for different bevel angles. As illustrated in FIGS. 14 and 15, the bevel pivot axis 204 is a virtual axis that is determined by the line formed by the point defined at the diametric center 204a of the arcuate slot 360 in the second trunnion member 194 and the point 204b defined at the diametric center of the arcuate slot 460 in the first trunnion member 190.

Figure 16:
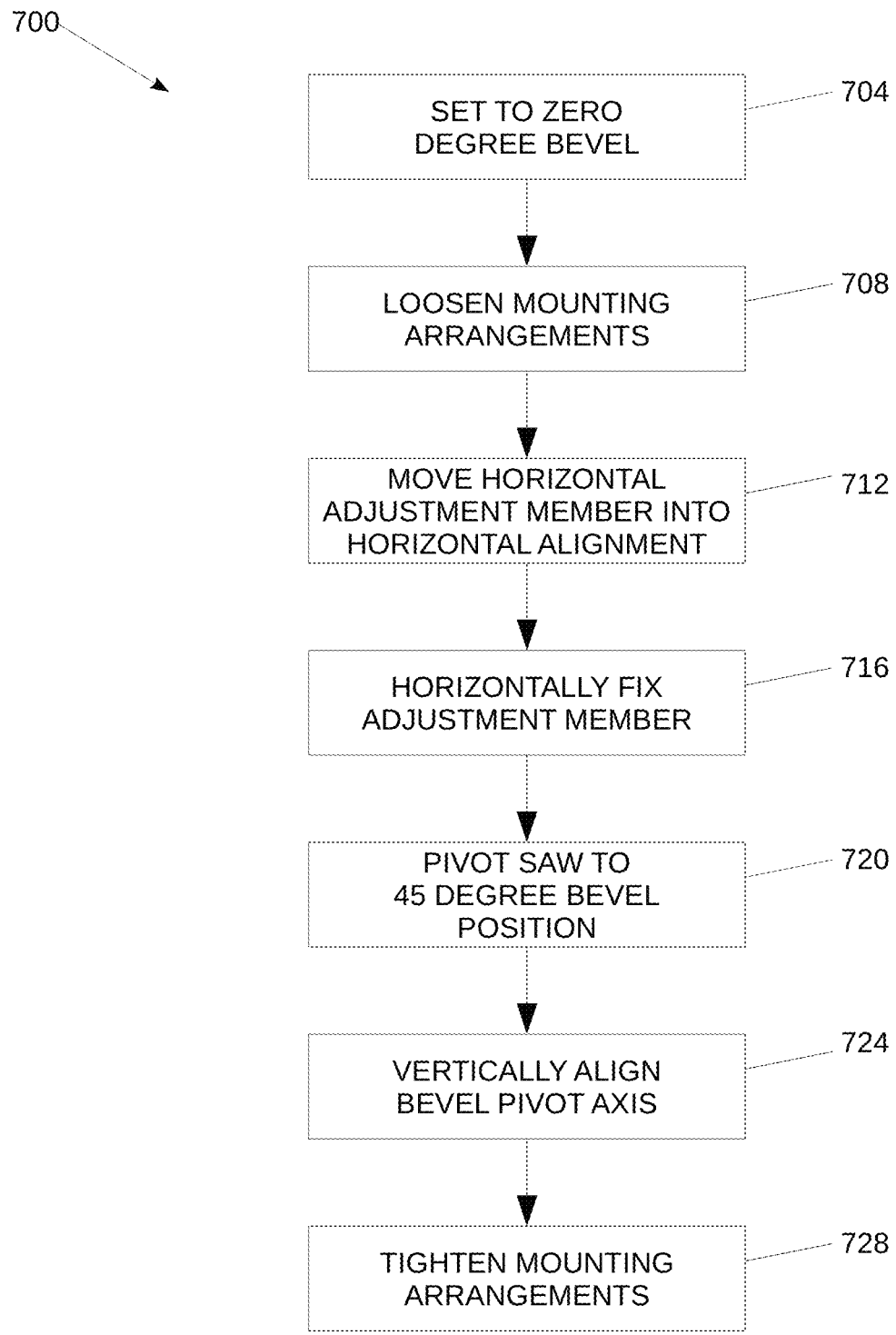
FIG. 16 is a process diagram of a method of adjusting the alignment of the bevel pivot axis of the table saw of FIG. 1.

FIG. 16 is a process diagram of a method 700 of adjusting the alignment of the bevel pivot axis 204, beginning with the horizontal bevel axis adjustment (blocks 704-716). The method 700 begins by moving the saw carriage 220 into the zero degree bevel position, as depicted in FIGS. 1-3 (block 704). Then, the user disengages the trunnion mounting arrangements by loosening front and rear mounting fasteners 332, 432, and the user loosens the jam nut 508 (block 708). With the front mounting fasteners 332 loosened, the second trunnion member 194 can be pivoted in the horizontal plane about the pivot pin 336.

When the rear mounting fasteners 432 are loosened, the first trunnion member 190 is retained in position in the horizontal plane by the horizontal bevel pivot axis adjustment arrangement 500, in particular by the threaded engagement between the elongated member 504 and the threaded opening 480. To adjust the horizontal alignment of the bevel pivot axis 204, the elongated member 504 is actuated by engaging and rotating the engagement region 540 (block 712).

Because of the threaded engagement between the threaded region 536 of the elongated member 504 and the threaded opening 480 in the side flange 404 of the first trunnion member 190, rotating the elongated member 504 causes the first trunnion member 190 and the elongated member 504 to move laterally relative to one another. Since the washers 512, 516 and the radially enlarged portion 544 of the elongated member 504 are constrained in the central recess 596 of the alignment projection 520 by the engagement between the flat surfaces 564 of the washers 512, 516 and the flat surfaces 588, 592 of the alignment projection 520, the elongated member 504 cannot move laterally relative to the table 104. Thus, the rotation of the elongated member 504 causes the first trunnion member 190 to move laterally relative to the table 104 as the threaded opening 480 moves along the threads of the threaded region 536 of the elongated member 504, thereby changing the horizontal position of the diametrical center 664 of the arcuate slot 460 in a controllable manner.

The lateral movement of the first trunnion member 190 therefore causes the saw carriage 220 to pivot relative to the pivot pin 336, thus changing the alignment of the bevel pivot axis 204. During the pivoting of the saw carriage 220, the side flange 404 of the first trunnion member 190 moves longitudinally by a small distance, thereby altering the alignment of the elongated member 504 relative to the alignment projection 520. The rod portion 532 of the elongated member 504 moves within the play provided in the central opening of the washers 512 while the conical or spherically-shaped surfaces 548, 552 of the elongated member 504 shift relative to the conical or spherically-shaped surfaces 568 of the washers 512, 516 while maintaining engagement therewith, thus compensating for the change in alignment of the elongated member 504 relative to the alignment projection 520. As such, the first trunnion member 190 can move without binding the radially enlarged portion 544 of the elongated member 504 within the central recess 596 of the alignment projection 520.

Once bevel pivot axis 204 is adjusted in the horizontal plane until it is aligned in the proper position, i.e. parallel to the edge of the saw blade slot 148, the jam nut 508 is threaded onto the threaded portion 536 of the elongated member 504 until the jam nut 508 abuts the side flange 404 of the first trunnion member 190 (block 716). The jam nut 508 disables further movement of the first trunnion member 190 relative to the elongated member 504 and the table 104 such that, even with the mounting fasteners 332, 432 still loosened, the horizontal alignment of the bevel pivot axis 204 is fixed relative to the table 104.

Next, if desired, the method 700 continues with the vertical alignment of the bevel pivot axis 204 (blocks 720-724). To vertically align the bevel pivot axis 204, the saw blade is first beveled to the 45 degree position (see, e.g., FIG. 15) (block 720). Then, the bevel pivot axis 204 is vertically adjusted by adding or removing shims 620 between the first trunnion member 190 and the first undercarriage mounting member 180 (block 724). Adding or removing shims 620 between the top surface of the bottom portion 500 of the first trunnion member 190 and the first undercarriage mounting member 180 of the table 104 changes the vertical position of the first trunnion member 190 relative to the table 104, thereby moving the axis point 204b at the diametrical center of the arcuate slot 440, which changes the vertical angle of the bevel pivot axis 204.

As the shims 620 are added or removed, the rod portion 532 of the elongated member 504 moves vertically within the two slots 580, 584 and the radially enlarged portion 544 of the elongated member 504 moves vertically within the central recess 596 of the alignment projection 520. The vertical movement of the elongated member 504 relative to the table 104 enables the vertical alignment of the bevel pivot axis 204 to be adjusted without affecting the horizontal alignment of the bevel pivot axis 204. The shims 620 are added or removed until the saw blade 160, at the vertical position where the saw blade 160 exits through the saw blade slot 148, is parallel to the saw blade slot 148 along the entire length of the saw blade 160.

Once the vertical alignment is complete, the mounting arrangements are engaged by tightening the mounting fasteners 332, 432, thereby clamping the first and second trunnion members 190, 194 to the respective first and second undercarriage mounting members 180, 184 (block 728). The alignment of the bevel pivot axis 204 is then complete.

In conventional table saws, the vertical and horizontal adjustment of the bevel pivot axis occurs with the carriage decoupled from the table and therefore movable relative to the table. Once the position is unlocked, it is entirely up to touch of the user to position the table. The user must horizontally align the carriage by manually moving the carriage relative to the table, then checking the alignment to determine whether the position is aligned. In conventional saws, it usually requires several trial-and-error iterations of the horizontal alignment to obtain an accurate alignment between the bevel axis and the saw blade slot. Once the horizontal alignment is accurate, the user then vertically aligns the carriage by inserting shims. Since the carriage is still free to move relative to the table, however, the vertical alignment can disrupt the horizontal alignment. The alignment process can therefore be an expensive operation on the production line and cause disruption for aligning the table saw once in service.

In the table saw 100 described herein, the horizontal bevel axis adjustment arrangement 500 allows for threaded adjustment of the bevel pivot axis 204 in the horizontal plane that fixes the location of the first trunnion member 190 in the plane of the table 104 while the mounting fasteners 332, 432 are loosened. As such, the bevel pivot axis 204 can be aligned precisely in the horizontal direction by using just one threaded adjuster, e.g. the elongated member 504.

Additionally, since the elongated member 504 is in threaded engagement with the first trunnion member 190, the horizontal position of the first trunnion member 190 can be locked in position for the vertical alignment. As a result, the vertical alignment process does not negatively affect the horizontal alignment of the bevel pivot axis 204.

Moreover, the radially enlarged portion 544 and the rod portion 532 of the elongated member 504 interlock with the two slots 580, 584 and the central recess 596 of the alignment projection, the first trunnion member 190 can be moved vertically relative to the table even when the horizontal position of the first trunnion member 190 is locked. As such, vertical alignment of the bevel pivot axis 204 can be performed after the horizontal alignment is completed, without negatively affecting the horizontal alignment of the bevel pivot axis 204.

While the illustrated embodiment describes the horizontal bevel axis adjustment assembly as being arranged at the first trunnion member, which is located in the rear of the table saw, the reader should appreciate that, in another embodiment, the horizontal bevel axis adjustment assembly is arranged at the second trunnion member, i.e. at the front of the table saw. In such an arrangement, a pivot pin arrangement similar to the pivot pin described above with reference to the second trunnion member may be arranged at the first trunnion member, i.e. at the rear of the table saw. In a further embodiment, a horizontal bevel axis adjustment assembly is arranged at both the first and second trunnion members, i.e. the rear and front trunnion members, and each of the horizontal bevel axis adjustment arrangements can be adjusted to align the bevel pivot axis.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A method of adjusting a bevel pivot axis of a table saw, the method comprising:
   disengaging a first mounting arrangement, which includes at least one fastener, to unclamp a first trunnion member from a table that defines a saw blade slot, the first trunnion member defining a first axis point of a bevel pivot axis and supporting a saw carriage; and
   inhibiting lateral movement and enabling vertical movement of the first trunnion member with a horizontal axis adjustment arrangement when the first mounting arrangement is disengaged; wherein:
   the horizontal axis alignment arrangement comprises an elongated member having a threaded region and the first trunnion member defines a threaded opening, and
   the inhibiting of the lateral movement includes inhibiting the lateral movement by threaded engagement of the threaded region and the threaded opening, wherein, during horizontal axis alignment of the bevel pivot axis, the elongated member is laterally immovable relative to the table.

2. The method of claim 1, wherein the inhibiting of the lateral movement includes inhibiting the lateral movement with a projection extending from an underside of the table that interacts with a radially enlarged portion of the elongated member, the radially enlarged portion positioned in a central recess of the projection.

3. The method of claim 2, further comprising:
   rotating the elongated member about an axis of the elongated member to cause a controlled lateral movement of the first trunnion member relative to the table.

4. The method of claim 3, further comprising:
   enabling vertical movement of the first trunnion member when the first mounting arrangement is disengaged via vertical movement of the elongated member within two slots defined in the projection.

5. The method of claim 1, wherein the disengaging of the first mounting arrangement includes disengaging at least two mounting fasteners of the at least one fastener so as to unclamp the first trunnion member from a first undercarriage mounting member of the table.

6. The method of claim 5, further comprising:
   inserting or removing at least one shim member between the first trunnion member and the table so as to adjust a spacing between the first trunnion member and the table to adjust a vertical position of the first axis point relative to the table.

7. The method of claim 1, further comprising:
   actuating the horizontal axis alignment arrangement when the first mounting arrangement is disengaged to laterally move the first trunnion member, wherein lateral movement of the first trunnion member enabled only by actuation of the horizontal axis alignment arrangement.

8. The method of claim 7, further comprising:
   disengaging a second mounting arrangement such that a second mounting arrangement allows movement of a second trunnion member relative to the table, the second trunnion member defining a second axis point of the bevel pivot axis and supporting the saw carriage; and
   pivoting the second trunnion member about a pivot axis that is substantially perpendicular to the bevel pivot axis when the horizontal axis alignment arrangement is actuated to laterally move the first trunnion member.

9. A table saw comprising:
a table that defines a saw blade slot;
a first trunnion member defining a first axis point of a bevel pivot axis, the first trunnion member supporting a saw carriage and defining a threaded opening;
a first mounting arrangement comprising at least one fastener, the first mounting arrangement configured to fix the first trunnion member to the table in an engaged state of the first mounting arrangement; and
a horizontal axis alignment arrangement comprising an elongated member having a threaded region that engages the threaded opening and configured, in a disengaged state of the first mounting arrangement, to inhibit lateral movement of the first trunnion member and to allow vertical movement of the first trunnion member,
wherein, during horizontal axis alignment of the bevel pivot axis, the elongated member is laterally immovable relative to the table.

10. The table saw of claim 9, wherein:
the table comprises a first undercarriage mounting member, and
the at least one fastener of the first mounting arrangement comprises at least two mounting fasteners configured in the engaged state to clamp the first trunnion member to the first undercarriage mounting member.

11. The table saw of claim 10, further comprising:
at least one shim member clamped between the first trunnion member and the table and configured to space the first trunnion member apart from the table so as to adjust a vertical position of the first axis point relative to the table.

12. The table saw of claim 9, wherein the horizontal axis alignment arrangement is configured such that, in the disengaged state of the first mounting arrangement, lateral movement of the first trunnion member enabled only by actuation of the horizontal axis alignment arrangement.

13. The table saw of claim 12, further comprising:
a second trunnion member defining a second axis point of the bevel pivot axis; and
a second mounting arrangement having an engaged state of the second mounting arrangement in which the second mounting arrangement fixes the second trunnion member to the table,
wherein, in a disengaged state of the second mounting arrangement, the lateral movement of the first trunnion by the actuation of the horizontal axis alignment arrangement causes the second trunnion member to pivot about a pivot axis that is substantially perpendicular to the bevel pivot axis.

14. A table saw comprising:
a table that defines a saw blade slot;
a first trunnion member defining a first axis point of a bevel pivot axis, the first trunnion member supporting a saw carriage;
a first mounting arrangement comprising at least one fastener, the first mounting arrangement configured to fix the first trunnion member to the table in an engaged state of the first mounting arrangement; and
a horizontal axis alignment arrangement configured, in a disengaged state of the first mounting arrangement, to inhibit lateral movement of the first trunnion member and to allow vertical movement of the first trunnion member,
wherein:
the horizontal axis alignment arrangement comprises an elongated member having a threaded region,
the first trunnion member defines a threaded opening,
the threaded region engages the threaded opening,
the elongated member includes a radially enlarged portion, and
the horizontal axis arrangement further comprises a projection extending from an underside of the table, the projection defining a central recess in which the radially enlarged portion is positioned, the radially enlarged portion interacting with the projection so as to inhibit lateral movement of the first trunnion member.

15. The table saw of claim 14, wherein the elongated member is configured such that rotational movement of the elongated member about an axis of the elongated member causes a controlled lateral movement of the first trunnion member relative to the table.

16. The table saw of claim 15, wherein the projection defines two vertical slots in which the elongated member is positioned, the elongated member being vertically movable in the two vertical slots so as to enable vertical movement of the first trunnion member in the disengaged state of the first mounting arrangement.

17. The table saw of claim 16, wherein the horizontal axis alignment arrangement further comprises a first washer and a second washer arranged in the central recess, the first washer having a first conical or spherical surface that engages a corresponding first conical or spherical surface of a first side of the radially enlarged portion, and the second washer having a second conical or spherical surface that engages a corresponding second conical or spherical surface of a second side of the radially enlarged portion.

18. The table saw of claim 17, wherein the horizontal axis alignment arrangement further comprises a jam nut removably arranged on the threaded member and configured to engage the first trunnion member so as to disable lateral movement of the first trunnion member.

* * * * *